US007003305B2

(12) United States Patent
Urs

(10) Patent No.: US 7,003,305 B2
(45) Date of Patent: Feb. 21, 2006

(54) METHOD AND APPARATUS FOR MESSAGE CALLBACK IN A COMMUNICATION SYSTEM

(75) Inventor: Kamala D. Urs, Bartlett, IL (US)

(73) Assignee: Motorola, Inc., Schaumburg, IL (US)

( * ) Notice: Subject to any disclaimer, the term of this patent is extended or adjusted under 35 U.S.C. 154(b) by 552 days.

(21) Appl. No.: 10/094,478

(22) Filed: Mar. 8, 2002

(65) Prior Publication Data

US 2004/0203940 A1 Oct. 14, 2004

(51) Int. Cl.
*H04Q 7/20* (2006.01)
(52) U.S. Cl. .................... 455/466; 455/414.2; 455/415
(58) Field of Classification Search ................ 455/466, 455/412.1, 412.2, 413, 414.1, 415; 379/88.11, 379/88.19, 88.21, 88.25
See application file for complete search history.

(56) References Cited

U.S. PATENT DOCUMENTS

| 5,416,770 | A | | 5/1995 | Stoner et al. |
| 5,418,835 | A | | 5/1995 | Frohman et al. |
| 5,557,605 | A | | 9/1996 | Grube et al. |
| 5,570,414 | A | | 10/1996 | Stern |
| 5,711,011 | A | | 1/1998 | Urs et al. |
| 5,764,731 | A | * | 6/1998 | Yablon ..................... 379/88.15 |
| 5,943,398 | A | | 8/1999 | Klein et al. |
| 5,987,317 | A | | 11/1999 | Venturini |
| 6,006,087 | A | | 12/1999 | Amin |
| 6,072,862 | A | | 6/2000 | Srinivasan |
| 6,081,707 | A | | 6/2000 | Christensen et al. |
| 6,085,231 | A | | 7/2000 | Agraharam et al. |
| 6,148,064 | A | | 11/2000 | Christensen et al. |
| 6,151,501 | A | | 11/2000 | Belkin et al. |
| 6,292,781 | B1 | | 9/2001 | Urs et al. |
| 6,330,079 | B1 | * | 12/2001 | Dugan et al. ................ 358/403 |
| 6,363,349 | B1 | | 3/2002 | Urs et al. |
| 6,408,176 | B1 | * | 6/2002 | Urs ............................ 455/413 |
| 6,502,127 | B1 | * | 12/2002 | Edwards et al. ............ 709/206 |

* cited by examiner

*Primary Examiner*—Erika A. Gary
(74) *Attorney, Agent, or Firm*—Jeffrey K. Jacobs

(57) ABSTRACT

The present invention encompasses various embodiments that provide convenient message callback for users in multi-service communication systems (e.g., 100). One set of embodiments enables users leaving messages to provide the callback number or address. This allows the calling party to indicate what communication service is preferable for callback. Another set of embodiments enables users retrieving messages to select the communication service they prefer for callback. The message server (114) provides this functionality by determining the callback number or address of the preferred type from the callback information provided by the original calling party. The present invention also provides for automatic callback once the called communication unit (102) receives the callback number or address.

10 Claims, 3 Drawing Sheets

US 7,003,305 B2

METHOD AND APPARATUS FOR MESSAGE CALLBACK IN A COMMUNICATION SYSTEM

FIELD OF THE INVENTION

The present invention relates generally to communication systems and, in particular, to voice mail callback using caller-related information associated with the voice mail.

BACKGROUND OF THE INVENTION

Radiotelephone communication systems are prevalent and widely used today. Such systems use fixed network equipment (FNE) connected to the public switched telephone network (PSTN) to provide telephony services to communication units located within the systems. Some radiotelephone systems also include a short message service center (SMSC) as part of the system's FNE, thereby integrating short message service (SMS) with telephony services. In radiotelephone communication systems that have SMS integrated with telephony services, a communication unit user may receive an SMS page and then call the telephone number indicated in a displayed SMS message using the same communication unit. One known technique to allow a user to call the telephone number displayed in the SMS message is for the communication unit user to select an SMS message and to initiate a call to a telephone number contained in that message by pressing a single key on the communication unit. Responsive to the depressed key, the communication unit searches the SMS message for a digit string indicative of the telephone number and automatically initiates a call to the found telephone number. Thus, the user is freed from the inconvenience of having to dial the number manually.

In addition to SMS, radiotelephone communication systems also provide voice mail services. A user retrieving a voice mail message often will want to return a call to the caller who left the message. Today, this callback is facilitated by voice mail servers (VMSs) in a number of ways. While the user is connected to the VMS, the VMS can effectively dial a telephone number for the user. For example, the VMS can dial the caller-ID telephone number that it stored when the message was left by the calling party. Moreover, some VMSs, such as the voice mail system described in U.S. Pat. No. 5,504,805, can dial a telephone number left orally within the voice mail message itself. Such VMSs employ known speech recognition technology to convert spoken numbers into digits used for dialing. The related patent application entitled, "METHOD AND APPARATUS FOR INITIATING A COMMUNICATION IN A COMMUNICATION SYSTEM," having Ser. No. 09/114,508 and assigned to the assignee of the present application, describes a system that extracts spoken caller-related information from a voice mail and sends it via SMS to the called party. Accordingly, the user is freed from having to write down or memorize the telephone number while listening to his or her voice mail, both of which are inconvenient options for a user on-the-move.

Although the prior art provides convenient callback for users, it is not a comprehensive solution. Users, especially those in multi-service communication systems, may need convenient callback for services other than telephone interconnect. Also, the use of voice recognition for callback may not be desired or preferred by some users. A more reliable alternative could thus meet the need expressed by these users. Therefore, an apparatus and method for message callback that provides convenient callback for an expanded set of services is needed.

DESCRIPTION OF A PREFERRED EMBODIMENT

The present invention encompasses various embodiments that provide convenient message callback for users in multi-service communication systems. One set of embodiments enables users leaving messages to provide the callback number or address. This allows the calling party to indicate what communication service is preferable for callback. Another set of embodiments enables users retrieving messages to select the communication service they prefer for callback. The message server provides this functionality by determining the callback number or address of the preferred type from the callback information provided by the original calling party. The present invention also provides for automatic callback once the called communication unit receives the callback number or address.

Figure 1:
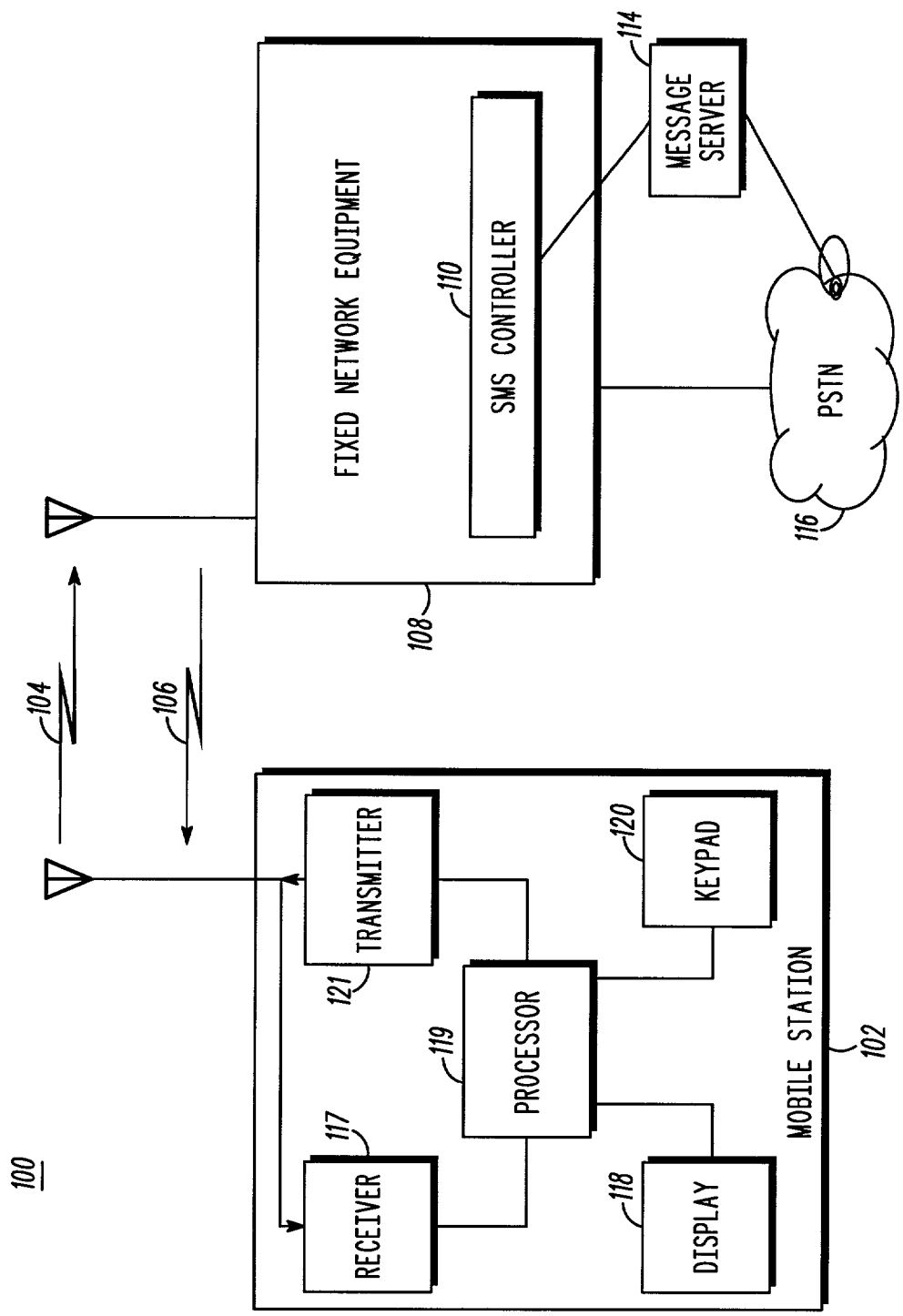
FIG. 1 illustrates a block diagram depiction of a communication system in accordance with a preferred embodiment of the present invention.

The present invention can be more fully understood with reference to FIGS. 1–5. FIG. 1 illustrates a block diagram depiction of communication system 100 in accordance with a preferred embodiment of the present invention. Preferably, communication system 100 comprises an "iDEN" communication system commercially available from Motorola, Inc. of Schaumburg, Ill. However, the present invention may also be implemented in communication systems that employ other technologies such as Global System for Mobile Communications (GSM), General Packet Radio Service (GPRS), Wideband Code Division Multiple Access (W-CDMA), CDMA2000, Enhanced Data rates for Global Evolution (EDGE), and Universal Mobile Telecommunications System (UMTS).

The preferred embodiment of the present invention includes communication units, such as mobile station (MS) 102. However, the present invention is not limited to communication units that are mobile or wirelessly connected to the network equipment. For example, a communication unit may comprise a desktop computer connected to the network equipment via the Internet. Those skilled in the art will recognize that FIG. 1 does not depict all of the network equipment necessary for preferred system 100 to operate but only those devices particularly relevant to the description of a preferred embodiment of the present invention.

As shown in FIG. 1, preferred system 100 comprises well-known devices such as communication unit 102, fixed network equipment (FNE) 108, message server 114, and public switched telephone network (PSTN) 116. Preferably, communication unit 102 is an "iDEN" radiotelephone while FNE 108 includes "iDEN" infrastructure components such as SMS controller 110. In the preferred embodiment, message server 114 comprises a voice mail system such as a Glenayre Voice Mail System commercially available from Glenayre Electronics, Inc. of Charlotte, N.C. However, message server 114 is not limited to embodiments that include voice mail systems but instead encompasses embodiments that include systems for storing user messaging information such as voice, fax, email, video, data, etc. Thus, message server 114's connection to PSTN 116 could be replaced with or supplemented with a connection via another network such as the Internet.

In the preferred embodiment, a known messaging system is adapted using known telecommunications design and development techniques to implement the message server aspect of the present invention. The result is preferred message server 114, which preferably performs the method described with respect to FIG. 3 and alternatively performs the method with respect to FIG. 4. However, those skilled in the art will recognize that the message server aspect of the present invention could alternatively be implemented in and across various physical components of system 100 rather than solely in message server 114.

FNE 108 and MS 102 communicate via "iDEN" air interface resources 104 and 106 as is known in the art. MS 102 preferably includes receiver 117, transmitter 121, processor 119 (which preferably includes memory and processing devices), display 118, and keypad 120. Transmitters, receivers, processors, keypads, and displays as used in MSs are all well known in the art. This common set of MS components is adapted using known telecommunications design and development techniques to preferably implement the communication unit aspects of the present invention. Thus modified, preferred MS 101 performs the methods described with respect to FIGS. 2 and 5.

Operation of a preferred communication system 100 in accordance with the present invention, occurs substantially as follows. A communication system user, such as a PSTN user, Internet user, or a user of another communication unit (not shown), attempts to communicate with the user of MS 102 using known telecommunication techniques (telephone, fax, email, internet, etc.). When MS 102 is inaccessible (e.g., because MS 102 is powered off or is currently engaged in other services) but has a messaging service (such as a voice mail service), the caller can leave a message on message server 114 for the user of MS 102.

For example, a calling MS of system 100 (not shown) that is unable to get a call through to MS 102 transmits messaging information (in this example, a voice message) to message server 114. The calling MS also obtains callback information from the user. Preferably, this callback information is a number or address at which the calling user wants the called user of MS 102 to return the call or message. Often this will be the number or address of the target callback device chosen by the calling user. Thus, callback information can take many forms including a dispatch identifier, a group dispatch identifier, a private dispatch identifier, a telephone number, a pager number, a fax number, an email address, an internet protocol (IP) address, etc.

The MS transmits the callback information obtained to message server 114. Typically, the user will enter the callback information using the MS keypad, while the MS transmits the corresponding Dual-Tone MultiFrequency (DTMF) signals to the FNE. However, the MS may also allow the user to select from pre-entered callback information using a menu of options or by entering an alias, such as "d" for dispatch ID, to indicate the selection.

Today, during interconnect call setup, either a calling MS sends calling party information to the serving mobile switching center (MSC) in the MS's setup message or the MSC looks up the calling party information using the information received in a setup and/or service request message. The calling party information sent or looked up is the calling party telephone number. However, in systems like "iDEN" that also support dispatch services, users may prefer to receive callbacks via a dispatch service rather than an interconnect service. Thus, in another embodiment, the calling MS sends its dispatch ID in the setup message. The MSC then sends the calling party information to the voice mail server, which stores it as callback information associated with the corresponding message. In this embodiment, the voice mail server actually stores both the dispatch ID and the telephone number as associated with the message.

In the preferred embodiment, message server 114 receives the messaging information from an MS, for example, and prompts the caller for the callback information. The voice mail server may do this audibly, requesting that the callback number be entered on the MS keypad, for example. The voice mail server would then interpret the DTMF signals and store the callback information obtained as related to the messaging information, so that the called MS, MS 102, can access the callback information along with the message.

In an alternate embodiment in which the preferred callback information is not obtained from the calling party, the message server may only have the calling party's telephone number (provided by the MSC, e.g.), and like caller ID, the telephone number is the number of the MS from which the call was originated. As mentioned above, systems like "iDEN" also support dispatch services. Users of such systems may prefer to receive callbacks via a dispatch service rather than via an interconnect service. The present invention proposes that the message server determine calling-party callback information using the already received calling-party identification information (the calling party's telephone number, e.g.). One way to determine the calling-party callback information is to use a database to determine, for example, the dispatch identifier that corresponds to the callback telephone number already received. Thus, the message server would access a database that mapped telephone numbers to dispatch identifiers.

When the called party contacts the message server to retrieve his or her messages, the called party may need to specifically request the message server to send the callback information (unless sent automatically). In fact, the message server may indicate (audibly, e.g.) what types or forms of callback information are available. What types are available will be a function of what types are stored by the message server and what types are mapped by accessible databases. For example, the available types may include callback information that is a dispatch identifier, a group dispatch identifier, a private dispatch identifier, a telephone number, a pager number, a fax number, a number spoken in the messaging information, a number provided by a calling party, an email address, or an internet protocol address. In requesting the callback information, the called party may indicate (by a key press and DTMF signaling, e.g.) what type is preferred. This may be a selection from the available types indicated or an indicator of a users' preset preference.

In the preferred embodiment, message server 114 sends to MS 102 the calling-party callback information determined. Preferably, the callback information is sent via SMS controller 110, although it may alternatively be sent by other means, including email. Receiver 117 thus receives the callback information from message server 114, preferably via SMS. Automatically then, processor 119 instructs transmitter 121 to transmit signaling to initiate callback using the callback information received. Thus, MS 102 automatically initiates a return call, of a type determined by the type of callback information received.

In an alternative embodiment in which the message server sends an indication that callback information is available, the MS receiver receives this indication, and the MS processor instructs the MS transmitter to transmit signaling to indicate, to the message server, the type of callback information that is requested. In response, the MS receiver receives the requested callback information from the message server via a short message service. The MS can then automatically initiate a return call using the requested callback information.

By automatically initiating the callback, the present invention frees the user from invoking communication unit features manually. Instead, the communication unit automatically uses the number or address in the callback SMS message to initiate a callback. This is an added convenience for users who are doing other things (especially with their hands) while retrieving their messages. In addition, by allowing both the callers who leave messages and the called parties to choose the communication service for callback, the present invention provides flexible callback in systems with multiple services.

Figure 2:
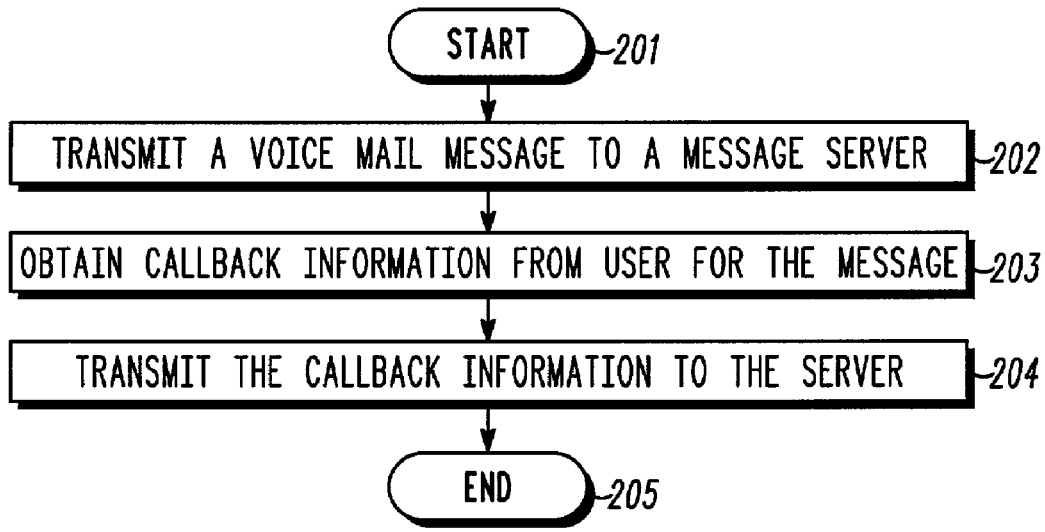
FIG. 2 illustrates a logic flow diagram of steps executed by a communication unit in accordance with a preferred embodiment of the present invention.

FIG. 2 illustrates a logic flow diagram of steps executed by a communication unit in accordance with a preferred embodiment of the present invention. Logic flow 200 begins (201) when a communication unit is used to leave a message (a voicemail message, e.g.) on a w message server. In addition to transmitting (202) the message, the communication unit obtains (203) callback information from the user. This is the information (e.g., the number or address) that the user would like to be used for callback purposes regarding the message. The callback information is transmitted (204) to the message server and logic flow 200 ends (205). Although logic flow 200 suggests that the callback information is obtained and transmitted after the message is transmitted, such an ordering of actions is not required by the present invention. It is understood by those skilled in the art that the transmission of the message and the callback information may occur in any order or concurrently.

Figure 3:
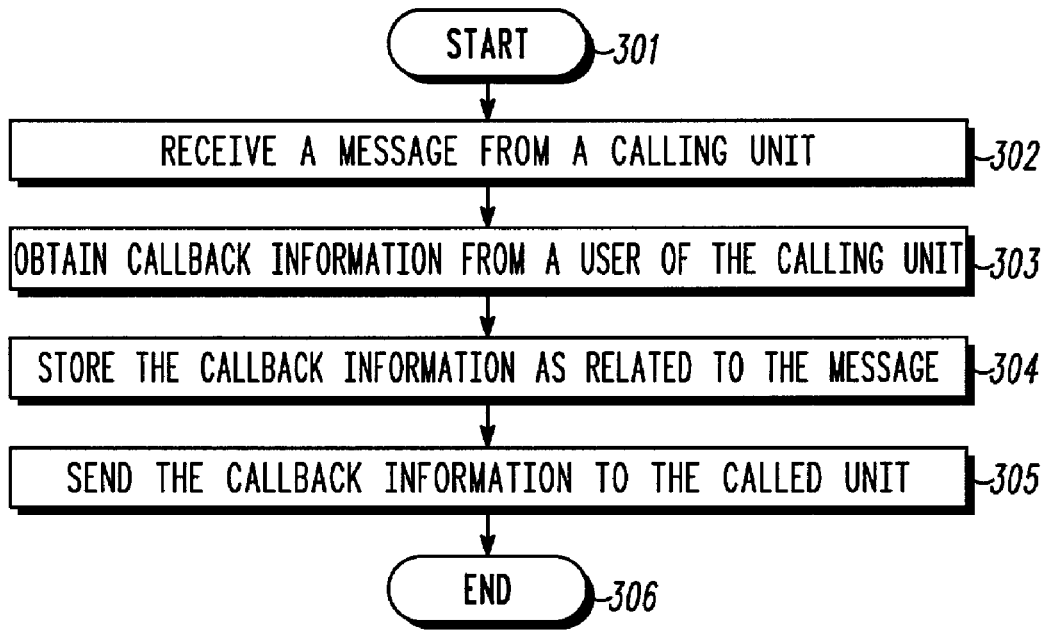
FIG. 3 illustrates a logic flow diagram of steps executed by a message server in accordance with a preferred embodiment of the present invention.

FIG. 3 illustrates a logic flow diagram of steps executed by a message server in accordance with a preferred embodiment of the present invention. Logic flow 300 begins (301) when the message server receives (302) a message from a calling communication unit. The message server also obtains (303) callback information from the user of the calling communication unit. The callback information is stored (304) as related to the message, so that when the called communication unit accesses the message server to retrieve its messages, the associated callback information can be sent (305). As discussed above, the callback information may be sent to the called communication unit automatically or upon the request of the called communication unit. Logic flow 300 thus ends (306). However, the ordering of actions suggested by logic flow 300 is not required by the present invention. For example, receiving the message and storing the callback information may be performed in any order or concurrently.

Figure 4:
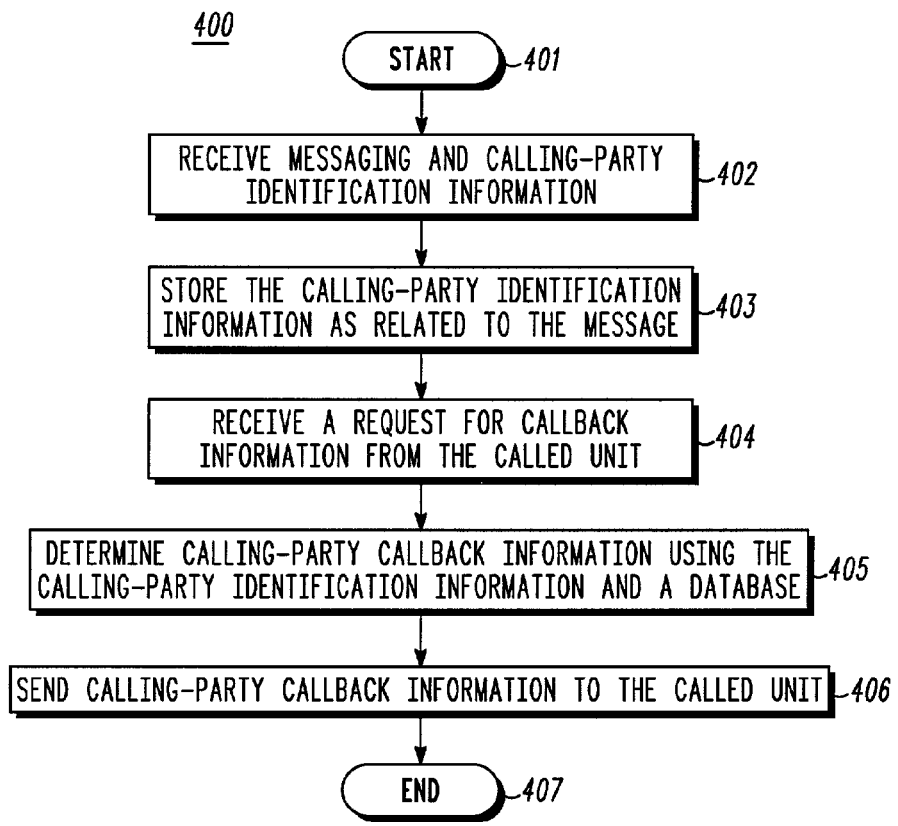
FIG. 4 illustrates a logic flow diagram of steps executed by a message server in accordance with an alternate embodiment of the present invention.

FIG. 4 illustrates a logic flow diagram of steps executed by a message server in accordance with an alternate embodiment of the present invention. Alternate logic flow 400 begins (401) when the message server receives (402) calling-party identification information and a message for a called party. Typically, the calling-party identification information is the telephone number of the communication unit leaving the message, although it could be any number or address that identifies the calling party. The calling-party identification information is stored (403) as related to the message.

When a request from the called communication unit is received (404) for callback information, the message server uses the calling-party identification information and a database to determine (405) the calling-party callback information. The request may indicate what communication service the called party would like to use for the callback. In such a case, the message server uses the database to convert the calling-party information that has been stored into callback information of the type requested by the called party. The callback information determined is then sent (406) to the called communication unit, and logic flow 400 ends (407).

Figure 5:
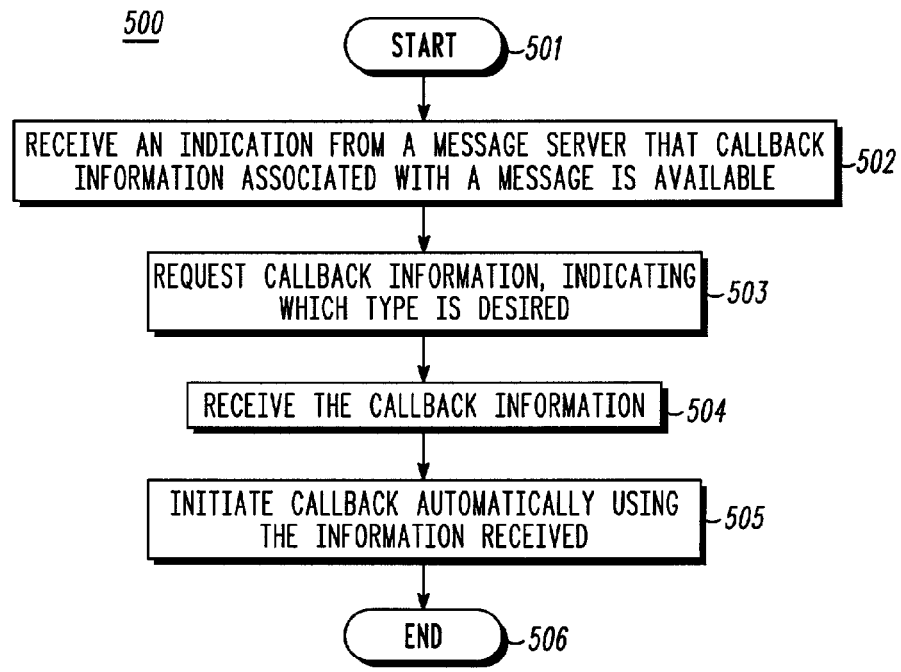
FIG. 5 illustrates a logic flow diagram of steps executed by a communication unit in accordance with an alternate embodiment of the present invention.

FIG. 5 illustrates a logic flow diagram of steps executed by a communication unit in accordance with an alternate embodiment of the present invention. Logic flow 500 begins (501) when the communication unit accesses a message server to retrieve messages and receives (502) an indication that callback information related to a message is available. The communication unit requests (503) the message server to send the callback information, possibly also indicating the type of communication service preferred for the callback. After receiving (504) the callback information, the communication unit uses the information to automatically initiate the callback.

While the present invention has been particularly shown and described with reference to particular embodiments thereof, it will be understood by those skilled in the art that various changes in form and details may be made therein without departing from the spirit and scope of the present invention.

I claim:

1. A method for a communication unit to perform message callback, the method comprising:
   receiving, from a message server via a short message service, callback information associated with messaging information for the communication unit; and
   initiating callback automatically, without user intervention, using the callback information received.

2. The method of claim 1 further comprising requesting the callback information from the message server.

3. The method of claim 2 further comprising receiving, from the message server, an indication that callback information of at least one type is available.

4. The method of claim 3 wherein the at least one type is at least one type selected from the group consisting of a dispatch identifier, a group dispatch identifier, a private dispatch identifier, a telephone number, a pager number, a fax number, a number spoken in the messaging information, a number provided by a calling party, an email address, and an internet protocol address.

5. The method of claim 3 wherein requesting the callback information comprises indicating which one of the at least one type is requested.

6. The method of claim 5 wherein indicating which one of the at least one type is requested comprises transmitting a DTMF signal.

7. The method of claim 1, wherein the message server comprises a server selected from the group consisting of a voice mail server, an email sewer, and a fax server.

8. A method for a communication unit to perform message callback, the method comprising:
receiving, from a message server, an indication that callback information is available, wherein the callback information is associated with messaging information for the communication unit on the message server;
indicating, to the message server a type of callback information requested;
receiving, from the message server via a short message service, the callback information requested; and
initiating callback automatically, without user intervention, using the callback information received.

9. A communication unit comprising:
a receiver adapted to receive, from a message server via a short message service, callback information associated with messaging information for the communication unit;
a transmitter; and
a processor, coupled to the receiver and the transmitter, adapted to instruct the transmitter to transmit signaling to automatically, without user intervention, initiate callback using the callback information received.

10. A communication unit comprising:
a receiver adapted to receive, from a message sewer, an indication that callback information is available and adapted to receive, from the message server via a short message service, requested callback information, wherein the callback information is associated with messaging intonation for the communication unit on the message sever;
a transmitter; and
a processor, coupled to the receiver and the transmitter, adapted to instruct the transmitter to transmit signaling to indicate, to the message server, a type of callback information requested and adapted to instruct the transmitter to transmit signaling to automatically, without user intervention, initiate callback using the callback information received.

* * * * *